Jan. 14, 1964   P. C. JACOBS   3,117,380
INDICATING CALIPERS
Filed May 6, 1963
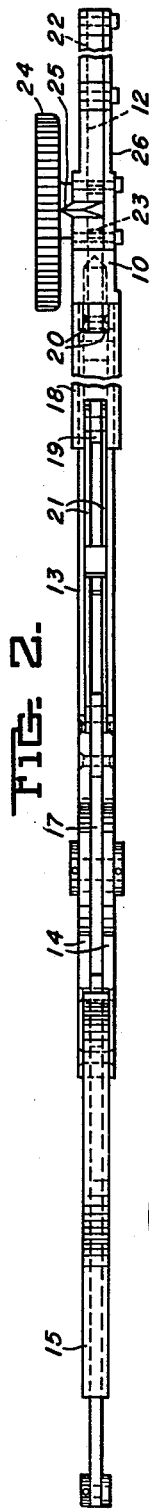
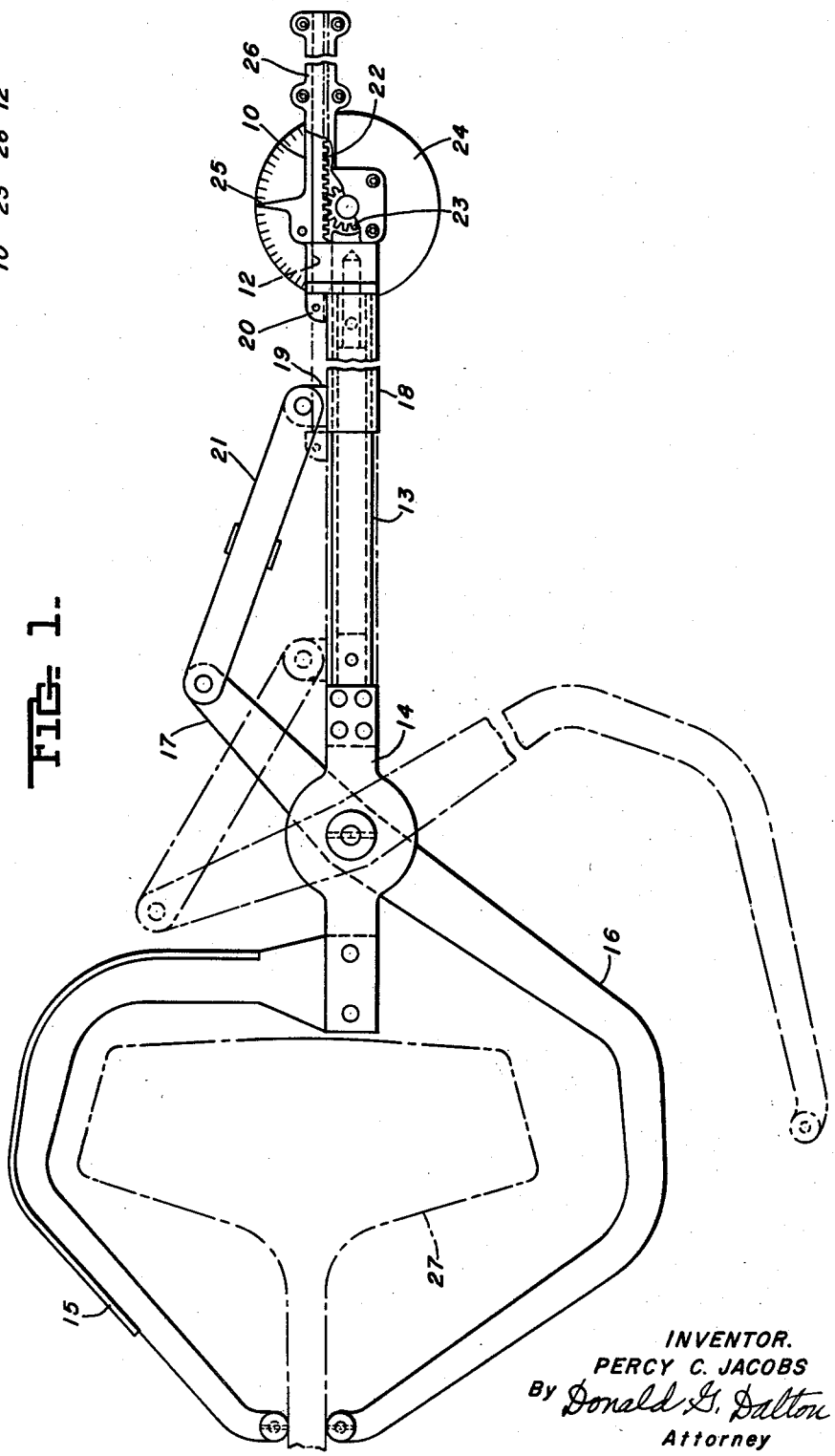
INVENTOR.
PERCY C. JACOBS
By Donald G. Dalton
Attorney United States Patent Office 3,117,380
Patented Jan. 14, 1964

3,117,380
INDICATING CALIPERS
Percy C. Jacobs, Chicago, Ill., assignor to United States Steel Corporation, a corporation of New Jersey
Filed May 6, 1963, Ser. No. 278,293
2 Claims. (Cl. 33—148)

This invention relates to improved calipers for measuring the thickness of an article.

An object of the invention is to provide improved calipers particularly adapted for measuring the web of a rolled section such as I-beam.

A further object is to provide improved calipers which are adapted to clear the flange of a rolled section to permit measurement of the web thickness at locations remote from the end.

A more specific object is to provide improved calipers of the foregoing type which include relatively stationary and movable caliper arms, a direct reading dial, and a rack and pinion mechanism connected with the movable arm for operating the dial.

In accomplishing these and other objects of the invention, I have provided improved details of structure, a preferred form of which is shown in the accompanying drawing, in which:

FIGURE 1 is a side elevational view of my calipers with a portion of the cover plate broken away; and FIGURE 2 is a top plan view of my calipers.

My calipers include a housing 10, which has a longitudinal passage 12. A rod 13 is fixed at one end to the housing. A pair of spaced-apart brackets 14 are fixed to the opposite end of the rod, and a relatively stationary U-shaped caliper arm 15 to the brackets. An opposed relatively movable U-shaped caliper arm 16 is pivoted between said brackets and has an integral lever 17 extending in the opposite direction from the pivot. A sleeve 18 is mounted on rod 13 for relative sliding movement, and carries upstanding ears 19 and 20 adjacent opposite ends. A double link 21 is pivoted at its ends to lever 17 and to ear 19. A gear rack 22 is fixed at its end to ears 20 and is received in passage 12 for sliding movement. A pinion 23 is journaled in housing 10 and meshes with the gear rack. The pinion shaft carries a graduated dial 24, and the housing carries a cooperating relatively stationary pointer 25. A cover plate 26 is fixed to housing 10 over the gear rack 22 and pinion 23.

In using the callipers to measure the web thickness of a rolled section, such as an I-beam 27, I slide sleeve 18 along rod 13 until the sleeve abuts the brackets 14. This movement opens the relatively movable caliper arm 16 to the position shown in dot-dash lines in FIGURE 1 and thus enables me to place the relatively stationary arm 15 over the flange of the I-beam. Next I pull sleeve 18 back until the tips of the two caliper arms abut opposite faces of the web of the I-beam. The gear rack 22 and pinion 23 of course move dial 24 in accordance with movement of arm 16. The dial is graduated so that the pointer 25 indicates the spacing between the tips of the two arms, which in this instance is the web thickness. I read this measurement directly on the dial without removing the calipers from the article.

From the foregoing description it is seen that my invention affords calipers of simple construction for easily measuring the web thickness of a rolled section. The caliper arms are bowed outwardly a sufficient distance that they clear the flange of the section. Hence the calipers can measure the web thickness anywhere along the length. In rolling I-beams, for example, it is important to be able to check the web thickness at various times. If the web is too thick when the beam leaves the blooming mill, it puts undue pressure on the roughing mill and excess metal in the web is rolled out into fishtails which must be scrapped. Nevertheless it is apparent that use of the calipers is not limited to any specific application.

While I have shown and described only a single embodiment of my invention, it is apparent that modifications may arise. Therefore, I do not wish to be limited to the disclosure set forth but only by the scope of the appended claims.

I claim:

1. A set of calipers comprising a housing, a rod fixed at one end to said housing, a pair of spaced-apart brackets fixed to the other end of said rod, a relatively stationary U-shaped caliper arm fixed to said brackets, an opposed relatively movable U-shaped caliper arm pivoted between said brackets, a lever fixed to said movable arm and extending from the opposite side of its pivot, a sleeve mounted on said rod for relative sliding movement, a link connecting said lever and one end of said sleeve, said housing having a longitudinal passage, a gear rack attached to said sleeve and received in said passage, a pinion journaled in said housing and meshing with said gear rack, a dial operatively connected with said pinion for rotation therewith, whereby said movable arm and said dial move with said sleeve, a cooperating pointer fixed to said housing adjacent said dial, and a cover plate fixed to said housing over said gear rack and pinion, said arms being bowed to clear a relatively wide flange of a rolled section to measure the thickness of a web therebeyond.

2. A set of calipers comprising a housing which has a longitudinal passage, a rod fixed at one end to said housing, a pair of spaced-apart brackets fixed to the other end of said rod, a relatively stationary U-shaped caliper arm fixed to said brackets, an opposed relatively movable U-shaped caliper arm pivoted between said brackets on an axis located between the end of said rod and said stationary arm, a lever fixed to said movable arm and extending in the opposite direction from the axis, a sleeve mounted on said rod for relative sliding movement, a link pivotally connected at its opposite ends to said lever and to one end of said sleeve, a gear rack fixed to the other end of said sleeve and slidably received in said passage, a shaft journaled in said housing, a pinion fixed to said shaft meshing with said rack within said housing, a dial fixed to said shaft outside said housing, whereby said movable arm and said dial move with said sleeve, a cooperating pointer fixed to said housing adjacent said dial, and a cover plate fixed to said housing over said gear rack and pinion, said arms being bowed to clear a relatively wide flange of a rolled section to measure the thickness of a web therebeyond.

References Cited in the file of this patent

UNITED STATES PATENTS

| 1,295,327 | Kaplan | Feb. 25, 1919 |
| 1,968,331 | Wittfoht | July 31, 1934 |
| 2,835,041 | Vogel | May 20, 1958 |

FOREIGN PATENTS

| 19,279 | Great Britain | 1910 |
| 284,826 | Switzerland | Dec. 1, 1952 |
| 410,806 | Germany | Mar. 19, 1925 |